United States Patent
Susnjara et al.

(12)

(10) Patent No.: US 6,502,002 B2
(45) Date of Patent: *Dec. 31, 2002

(54) SYSTEM AND METHOD OF IMPLEMENTING NEW PRODUCT DESIGNS ON COMPUTER NUMERICAL CONTROL MACHINES

(75) Inventors: Kenneth J. Susnjara, Birdseye; Michael P. Hardesty, Dale, both of IN (US)

(73) Assignee: Thermwood Corporation, Dale, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/078,899

(22) Filed: May 13, 1998

(65) Prior Publication Data

US 2002/0055797 A1 May 9, 2002

(51) Int. Cl.[7] ............................................. G06F 19/00
(52) U.S. Cl. ........................... 700/95; 700/114; 700/17; 700/193
(58) Field of Search .............................. 700/95, 17, 56, 700/83, 86, 114, 179, 192, 193; 345/520, 521; 364/468, 474; 395/919, 920, 923; 382/42, 249, 16, 56

(56) References Cited

U.S. PATENT DOCUMENTS

| | | | | |
|---|---|---|---|---|
| 4,606,001 A | * | 8/1986 | Rieben et al. | |
| 4,796,341 A | * | 1/1989 | Kuhn, III | 29/33 |
| 4,870,592 A | * | 9/1989 | Lampi et al. | 364/468.19 |
| 5,241,732 A | * | 9/1993 | Tseng | 29/33 P |
| 5,283,943 A | * | 2/1994 | Aguayo et al. | 29/701 |
| 5,368,539 A | * | 11/1994 | Mills et al. | 483/1 |
| 5,493,767 A | * | 2/1996 | Susnjara | |
| 5,735,513 A | * | 4/1998 | Toffolon | 269/43 |
| 5,771,950 A | * | 6/1998 | Hardesty | 144/135.2 |
| 5,864,482 A | * | 1/1999 | Hazama et al. | |
| 5,984,503 A | * | 11/1999 | Strickland et al. | 364/468.01 |

* cited by examiner

Primary Examiner—David Wiley
Assistant Examiner—Firmin Backer
(74) Attorney, Agent, or Firm—Stevens, Davis, Miller & Mosher

(57) ABSTRACT

The present invention discloses an apparatus and a method using a multi-purpose flexible CNC machine that is able to perform a variety of machining operations on all parts of a product. Specific operations include carving, boring, cutting, grooving, molding, shaping, routing, mortising, edge working, sawing, planing, squaring, sanding, drilling and dovetailing. The CNC control integrates machining instructions, operator instructions and sequence of operations into a coherent package.

37 Claims, 9 Drawing Sheets

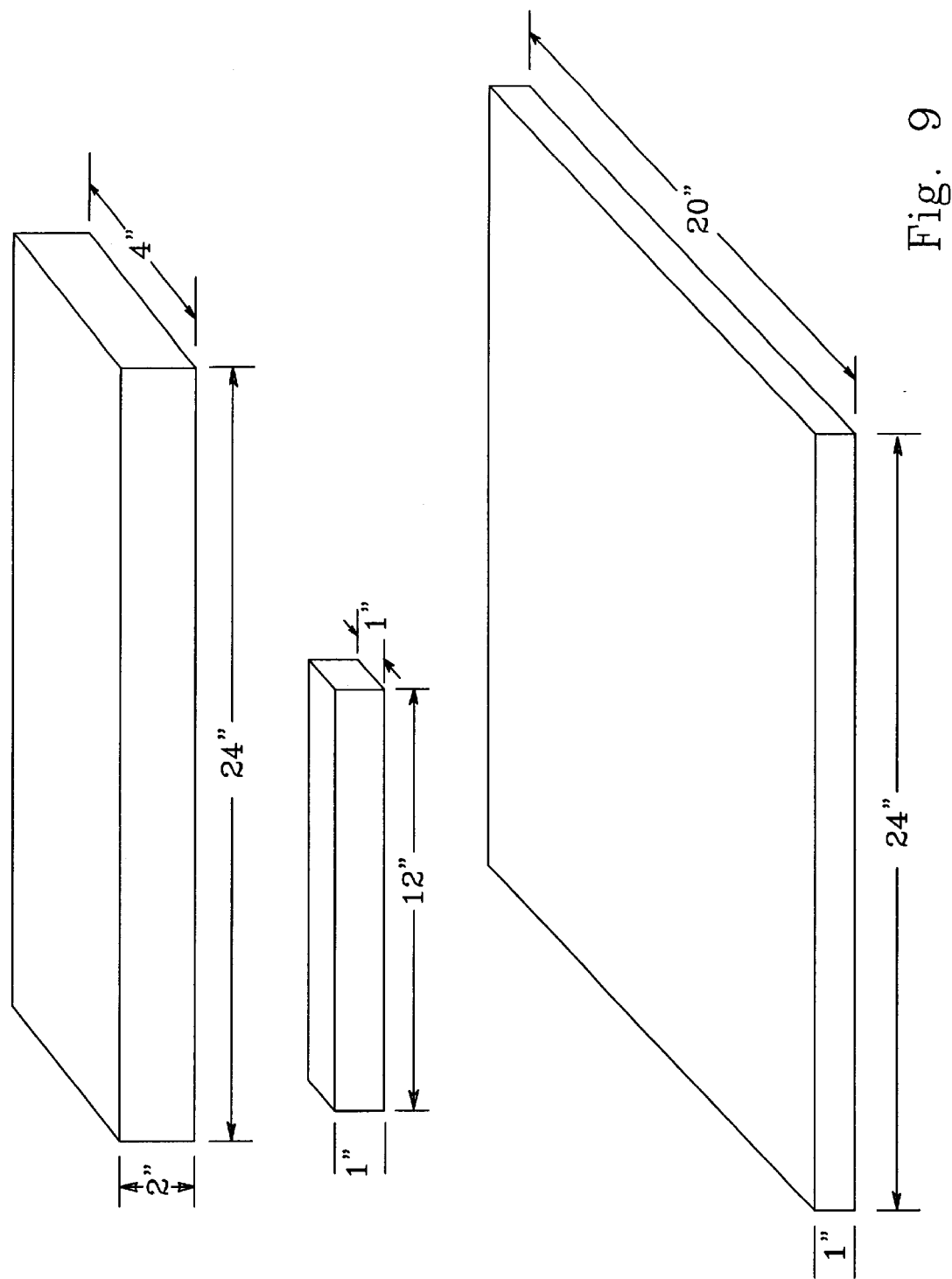

SYSTEM AND METHOD OF IMPLEMENTING NEW PRODUCT DESIGNS ON COMPUTER NUMERICAL CONTROL MACHINES

TECHNICAL FIELD

This invention relates to a Computer Numerical Control (CNC) machine. More particularly, the present invention uses multi-media to coordinate production arrangements between a CNC machine and its operator.

BACKGROUND OF THE INVENTION

The machining industry is one of the most fundamental industries of industrial and developing countries. It is an industry that has a direct impact on almost all manufactured goods. The technological advancement of the machining industry, from a short-term impact perspective, has a direct bearing on the quality of goods, the durability of goods, the production capability of goods, and the desirability of goods. From a long-term impact perspective, the technological advancement of the machining industry has a direct impact on the competitiveness of a country's product in the world market. The present invention is a major breakthrough in the concept and methodology of the machining industry that will revolutionize the manufacturing base of U.S. industries.

Ever since the industrial revolution, many manufacturing bases of U.S. industry embraced manufacturing cost savings based on the economy of scales. Depending upon the state of technology at any moment in time, many manufacturing bases of U.S. industries established manufacturing plants that are optimized based on mass production only to be limited by the technology of the day. From this background, the conventional concept and methodology of manufacturing have been established. With the advancement of computer technology, the conventional concept and methodology of manufacturing are becoming more outdated with each passing day.

Take the furniture manufacturing industry for example, the conventional concept and methodology teach batch and specialized productions, where each production line manufactures only one of many parts that are required for a desired piece of furniture. This concept and methodology is anchored upon amortizing machine setup times over a long period of time. The advantages of this concept and methodology are increased production efficiency, low per part cost, and simplicity of manufacturing on each production line. The disadvantages of this concept and methodology of manufacturing are high initial investment cost, large warehouse storage requirements, heavy transportation cost, high man-hour labor requirement, and complex record keeping. This conventional concept and methodology of manufacturing is only viable when the demand for goods require mass production. Should the demand for goods be less than the scale of manufacturing, the per-part cost increases substantially.

Based on the unprecedented advancement of computer technology, Thermwood Corporation of Dale, Indiana has implemented a new concept and methodology of manufacturing in the present invention. The present invention substantially overcomes the disadvantages stated above yet yields a return that substantially conforms to that of a mass production.

SUMMARY OF THE INVENTION

One object of the present invention is to implement a new manufacturing process.

A second object of the present invention is to produce a plurality of parts from a series of work zones on a single worktable.

A third object of the present invention is to conveniently provide manufacturing instructions to an operator.

A fourth object of the present invention is to provide an efficient method of producing complex parts of a piece of furniture.

A fifth object of the present invention is to provide manufacturing instructions through a display and a speaker.

A sixth object of the present invention is to reduce the cost of small order productions.

A seventh object of the present invention is to incorporate all the required skills into a CNC machine thus relieving dependency upon a highly skilled machine operator.

An eighth object of the present invention is to minimize the chances of operator error in a production.

BRIEF DESCRIPTION OF THE DRAWING

FIG. 9 is a perspective view of wood stock of various sizes.

DETAILED DESCRIPTION

The present invention implements a concept and methodology of manufacturing that is based on an assumption of near zero setup time for short run productions. Unlike batch productions that require multiple machines each producing a large quantity of the same part, the present invention uses a single multi-purpose flexible work center to manufacture all parts of a product.

For example, due to the large quantity of different parts in a piece of furniture, it is very difficult if not impossible for an operator to remember the configurations and dimensions of each component and correctly machine them. Therefore, the present invention incorporates machining operations, part placement instructions, and sequence of operations into one single package. This way, it is the controller that keeps track of configurations and dimensions of parts. All that the operator has to do is to follow the part placement instructions and implement them correctly. As the parts are being machined, an operator can concurrently perform assembly work. This concept and methodology of furniture production not only overcome all the above-mentioned disadvantages, but also produce better quality furniture.

It is well known in the furniture manufacturing industry that wood is not a very stable material. Depending upon the moisture content within a piece of wood, the shape of the piece of wood changes within days. Therefore, in a batch production, a manufacturer must provide humidity-controlled environments to store cut pieces, escalating the overall cost of manufacturing. The present invention overcomes this problem by cutting all required parts at the same run and assemble all the parts on the same day they are cut. Details of the present invention will become apparent in view of the following explanations. A book titled "Furniture Manufacturing in the New Millennium" written by the Kenneth J. Susnjara is incorporated herein by reference.

Figure 1:
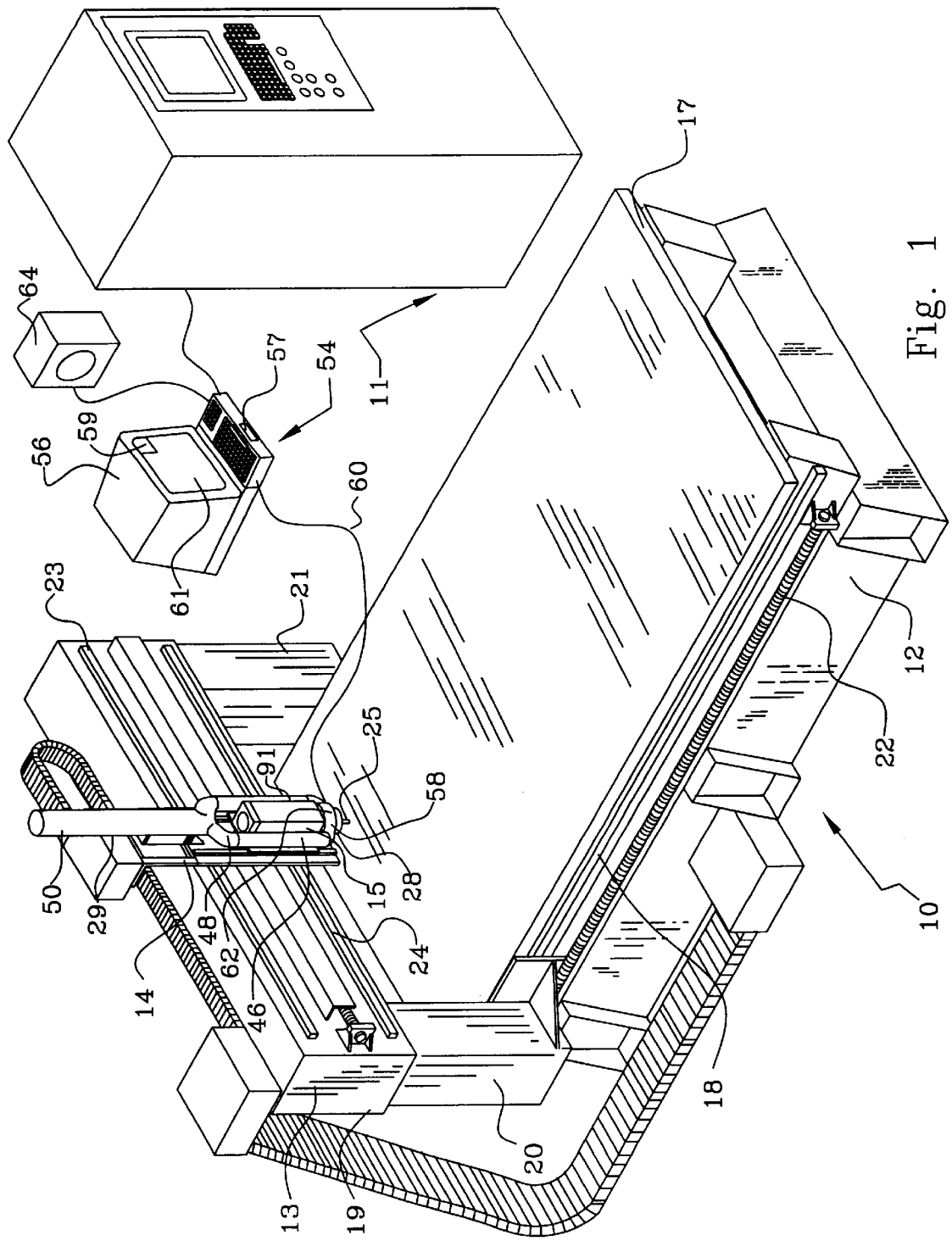
FIG. 1 is a perspective view of a computer controlled router machine.

FIG. 1 illustrates a router machine 10 and a machine controller 11. They are operatively connected for displacing a router bit of the machine along a longitudinal line of travel or along an x-axis, a transverse line of travel or along a y-axis and a vertical line of travel or along a z-axis in accordance with a program executed by the controller for performing a work function on one or more workpieces positioned on the machine. Preferably, the controller will have multi-tasking capabilities such as that of the Thermwood 91000 SuperControl, available from the Thermwood Corporation, Dale, Indiana. In the Thermwood SuperControl, the "front end" of the machine controller is a Pentium-based personal computer (PC) shown generally as 54 in FIG. 1, which computer includes a video monitor 56 and a speaker 64. The PC processor provides the control and communication functions for the PC compatible peripheral devices including display 56.

Generally, the machine includes a base member 12, a bridge member 13, a tool head support assembly 14 and a tool head assembly 15. The base member is provided with a work table 17 rigidly mounted on the base member and a pair of trackways 18 mounted on the sides of the base member and disposed parallel to the x-axis of the machine. Worktable 17 supports one or more workpieces to be machined. Such workpieces are positioned by positioning pins or other means and secured in position by clamps, a vacuum hold-down system or any other means.

The bridge member includes a transversely disposed beam section 19 spaced above and spanning the base member, and a pair of transversely spaced, depending leg sections 20 and 21 straddling the sides of the base member and mounted on trackways 18 for displacement relative to the base member along the x-axis. The bridge member is displaced relative to the base member along the x-axis by means of a pair of drive screw assemblies 22 operatively interconnecting the side portions of the base member and inner side portions of leg sections 20 and 21.

Tool head support assembly 14 is supported on and guided along a pair of transversely disposed, vertically spaced trackways 23 and 24 provided on a front face of transverse beam section 19, and is displaceable along the y-axis by a drive screw assembly operatively interconnecting the bridge member and the tool head support assembly. Each of the tool head assemblies is supported and displaceable along transversely spaced, vertically disposed trackways mounted on support assembly 14, and is adapted to be displaced by a drive screw assembly operatively interconnecting the support assembly and a tool head assembly. Each of the tool head assemblies further is provided with a router bit 25 adapted to be displaced along the x, y and z axes to provide a cutting pattern.

Figure 2:
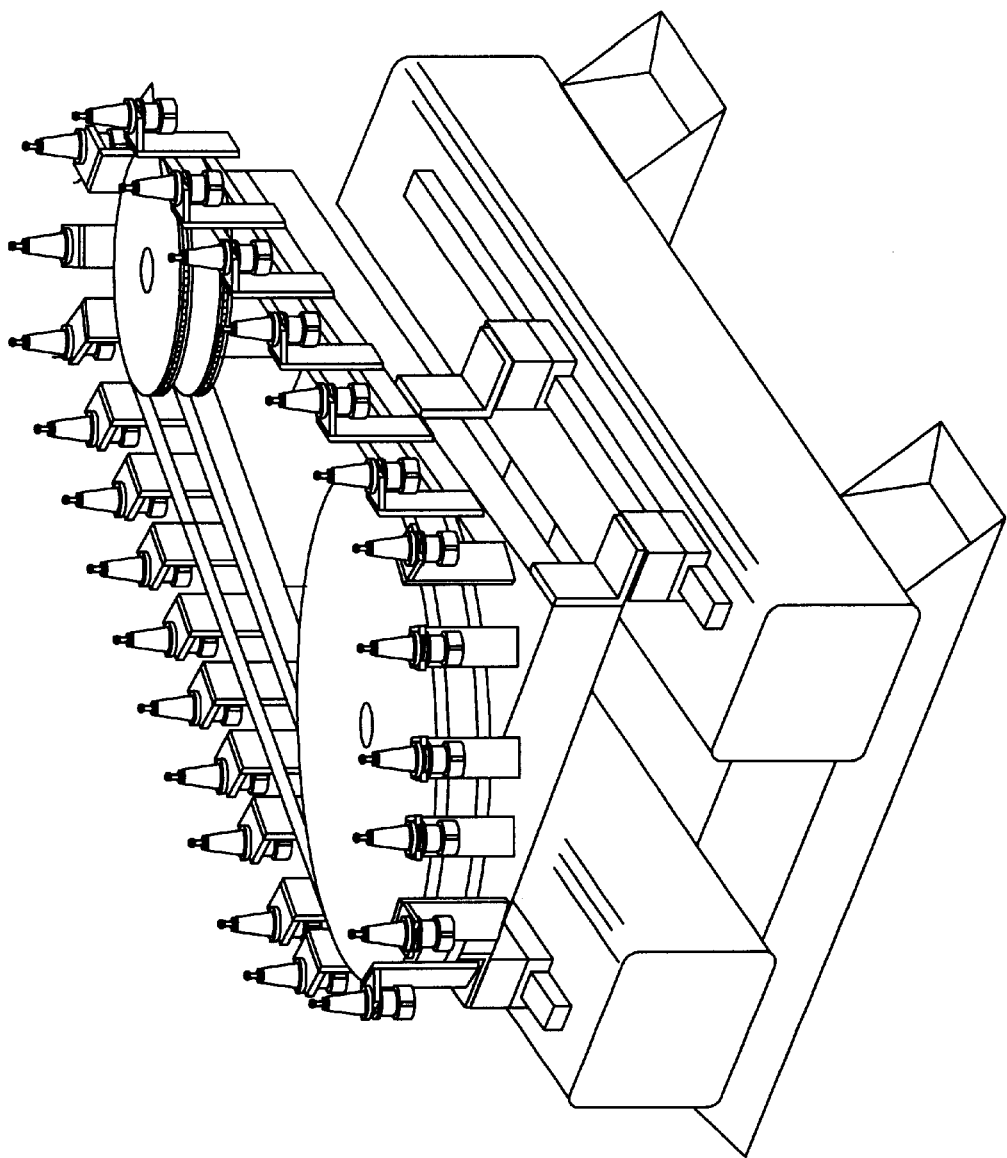
FIG. 2 is a perspective view of a tool changer capable of holding 50 tool bits.

FIG. 2 shows a tool changer designed to work cooperatively with the router of FIG. 1. This tool changer contains up to 50 different tool bits for a variety of machine operations. If more tool bits are required, multiple tool changers can be installed for a single CNC machine. Each tool bit is assigned to a location with a specific address. This information is available to either computer 54 or machine controller 11. Whenever a particular tool bit is called for in a program, toolhead assembly 15 would automatically return any mounted tool bit to its assigned address and automatically go to a predetermined address to acquire the required tool bit. This cycle only takes about thirty seconds.

Figure 3:
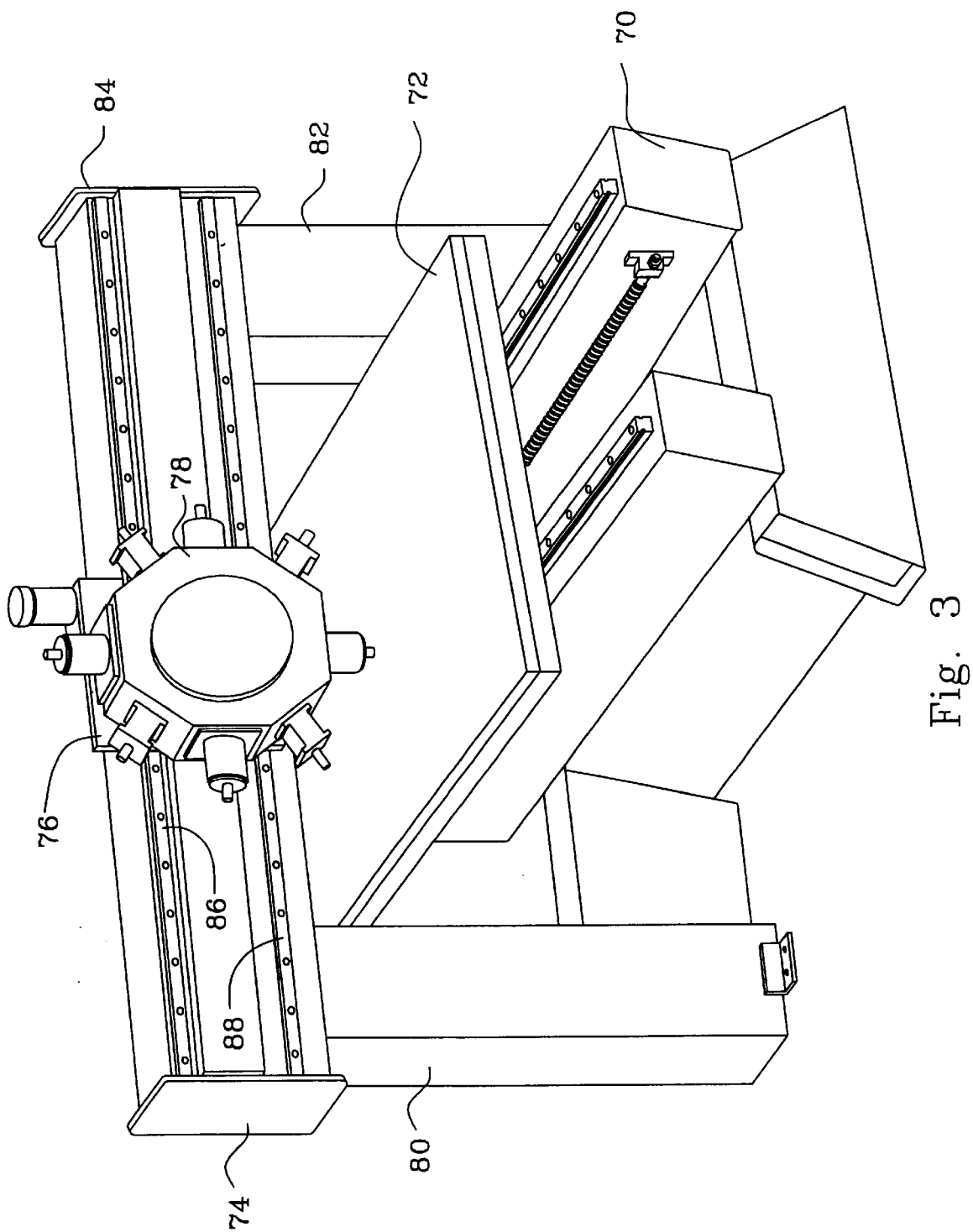
FIG. 3 is another perspective view of a computer-controlled router with a turret machine tool system.

FIG. 3 illustrates another embodiment of the present invention. This embodiment includes a base member 70, a worktable 72, a gantry 32, a toolhead support assembly 33 and a toolhead assembly 74. The base member is formed of steel sections welded together to provide a rigid end stable foundation. Worktable 72 is mounted horizontally on the base member and is adapted to be displaced longitudinally relative to the base member or along a y-axis. Gantry 74 includes a pair of leg members 80 and 82 rigidly secured at their lower ends to the base member, and a transversely disposed section 84 supported on the leg sections and spanning above the worktable. The front face of transverse section 84 is provided with a pair of vertically spaced, transversely disposed rails 86 and 88 on which toolhead support assembly 76 is mounted and displaceable transversely or along an x-axis. Toolhead assembly 78 is mounted on the toolhead support assembly adapted to be displaced vertically or along a z-axis. Each of worktable 72, toolhead support assembly 76 and toolhead assembly 78 is displaceable along its respective axis by a feedscrew arrangement driven by an AC servomotor. The operation of such servomotors is controlled by a Computer Numerical Control (CNC) to provide for the movement of a tool mounted on the toolhead assembly along a motion path to perform a work function such as routing, shaping, drilling, sanding and the like on a workpiece mounted on the worktable. Instead of the worktable being displaceable and the gantry being stationary as described, the worktable can be stationary and the gantry may be displaceable along the y-axis to provide the displacement between the gantry and the worktable.

As it has been shown that the toolhead assembly 34 is a turret system comprising of 8 tool bits. This machine is more suitable for machining operations requiring less tool bits. Due to its rotary design, all the right tool bits are at most simply one revolution away, further curtailing the need to mount or dismount tool bits.

Figure 4:
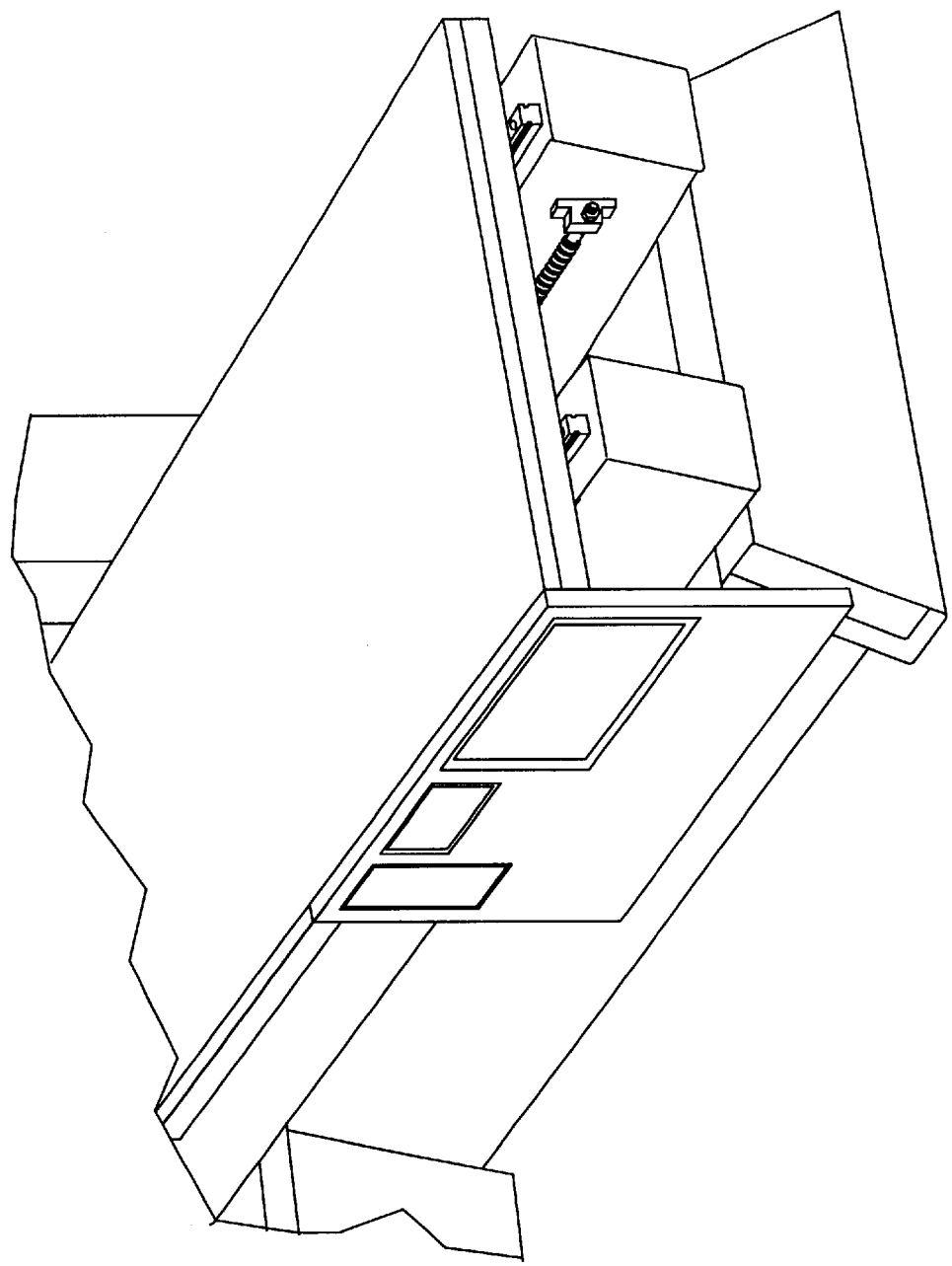
FIG. 4 is a perspective view of a machine vertical side table.

FIG. 4 shows a vertical side table of the present invention. This vertical arrangement is especially useful for edge working such as dovetailing and edge boring. In operation, the wood panels are affixed to the vertical side table. The toolhead assembly then travels along x, y, and z-axes to perform the desired wood work.

Figure 5:
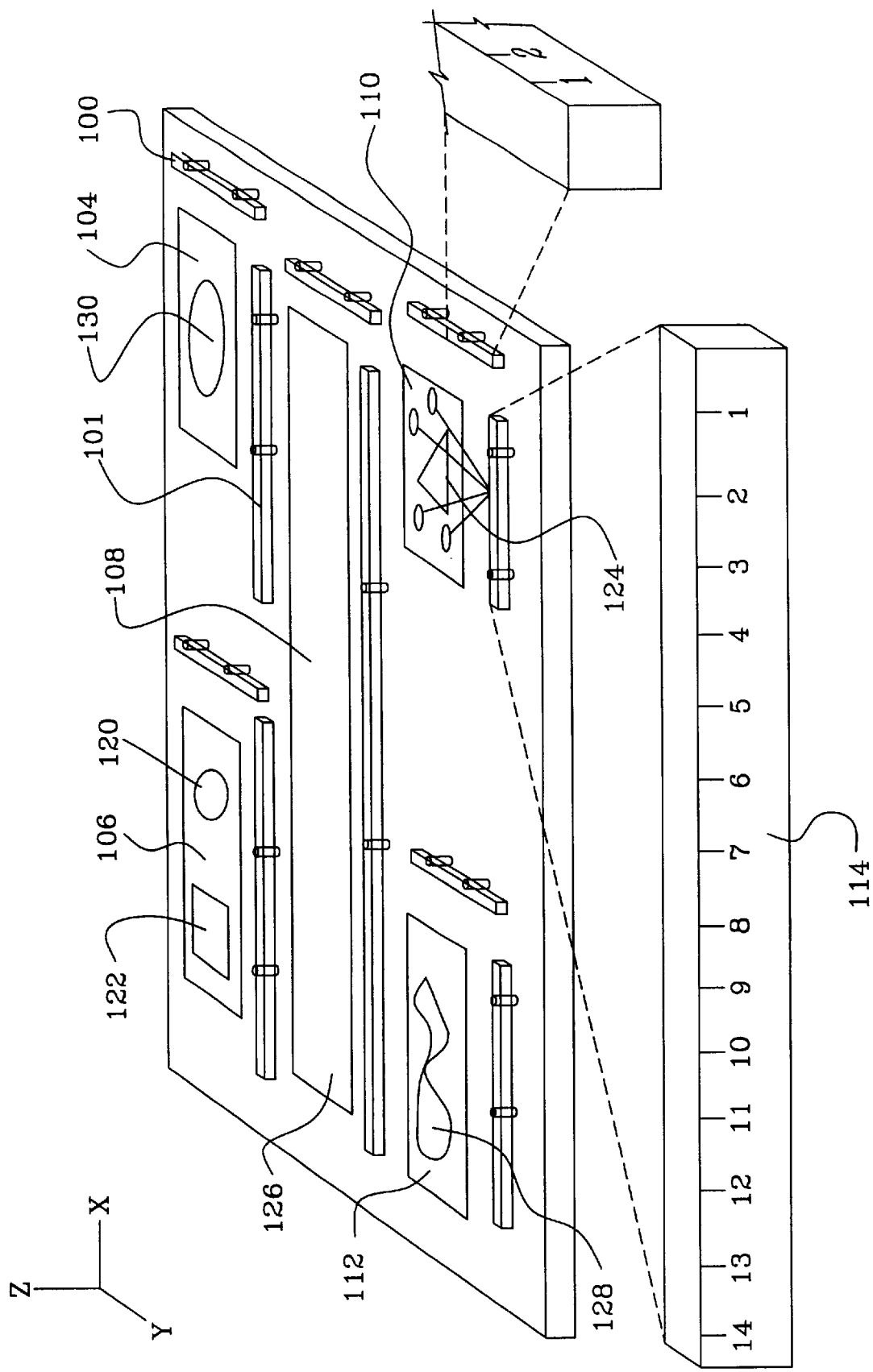
FIG. 5 is a perspective view of a machine table attached with fences and pop-up pins.

FIG. 5 shows a possible worktable arrangement for the present invention. This worktable can be used for the embodiment in either FIG. 1 or 3. Mounted on this worktable is a plurality of pop-up pins. A plurality of fences 100 and 101 can be placed in lieu of these pop-up pins. These pop-up pins and fences are locating pins and locating fences, even though they can be used in conjunction to allow the fences lean securely against the pop-up pins. Adjacent to these fences is a plurality of work zones 104, 106, 108, 110 and 112.

Any workpieces can be placed in these work zones. In addition to the option of securing workpieces by the pop-up pins and fences, each work area comprises of a plurality of vacuum holes and rubber seals to hold the workpiece by air suction. The number of rubber seals in each work area and the configurations of each rubber seal depend on the specifications of the parts to be machined. What is important is that there must be vacuum holes within the enclosure of the rubber seal. Reference numerals 120, 122, 124, 126, 128 and 130 in FIG. 5 illustrate some representative configurations and arrangements. For most operations, the suctioning effect would be sufficient to hold a workpiece without the assistance of pop-up pins and fences. In fact, most of the time, the fences and pop-up pins are merely used for referencing purposes. The sized of the fences and work zones can be altered to suit the characteristic of the wood dimensions and machining requirements.

Reference numeral 114 shows an enlarged view of fences 100 and 101. It is shown that both segments of the L-shape fences also contain a ruler that can be used to measure the dimensions of a workpiece. There is also a gap between both segments of the L-shaped fences. This is for the purpose of removing wood dust from the machining area.

Figure 6:
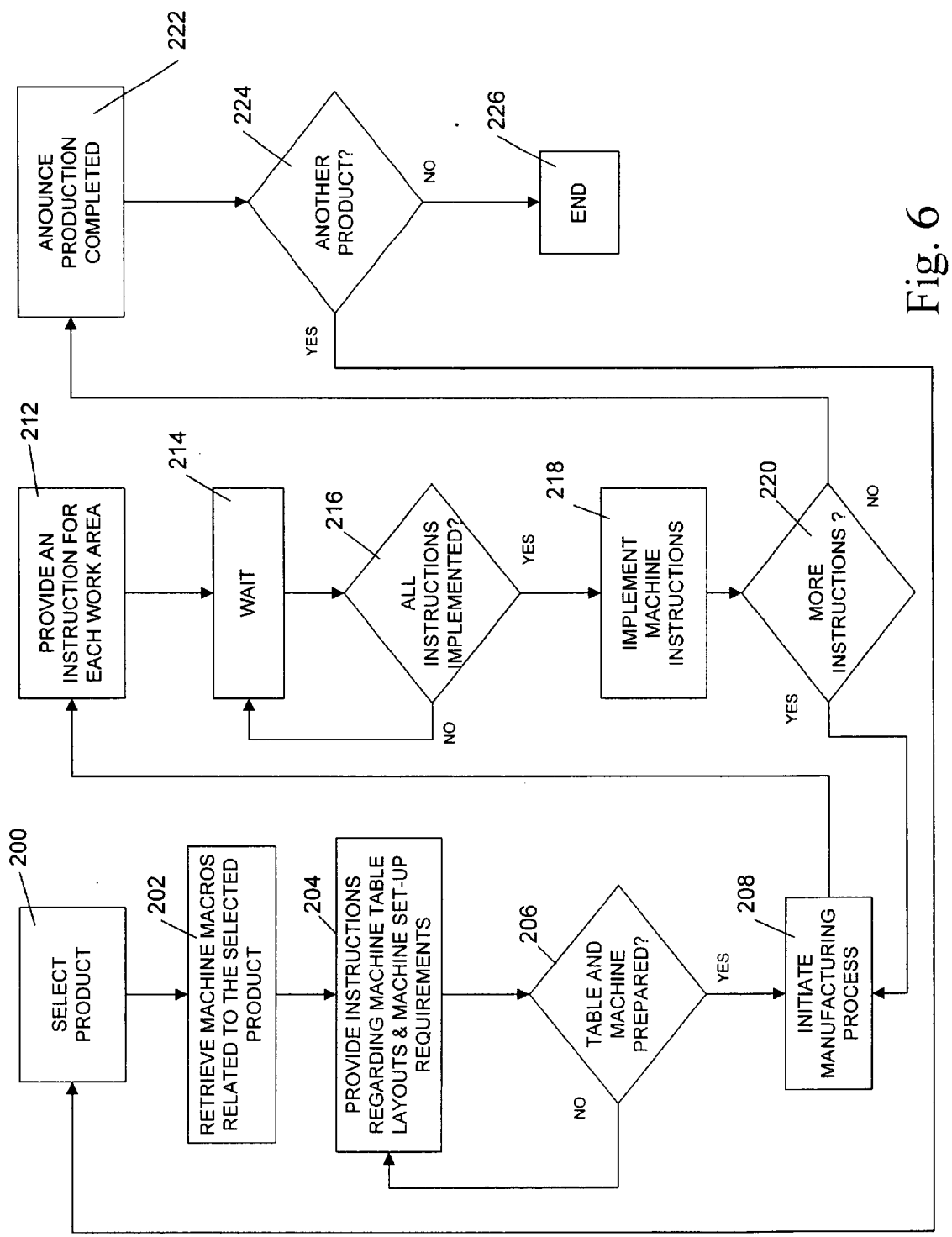
FIG. 6 is a logic diagram illustrating the operation of the present invention.
Figure 7:
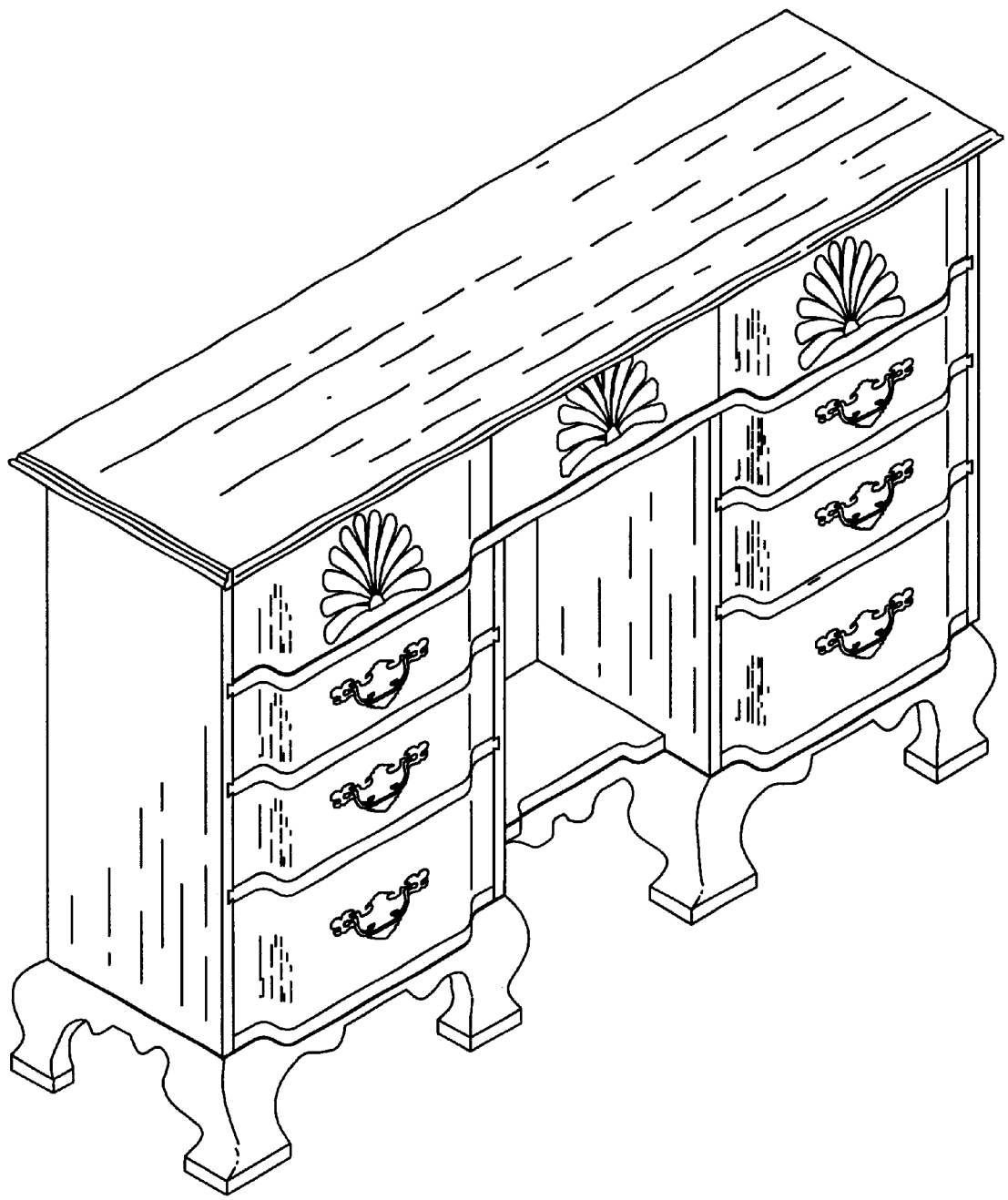
FIG. 7 is a perspective view of a desk representative of an end product that can be manufactured by the present invention.
Figure 8:
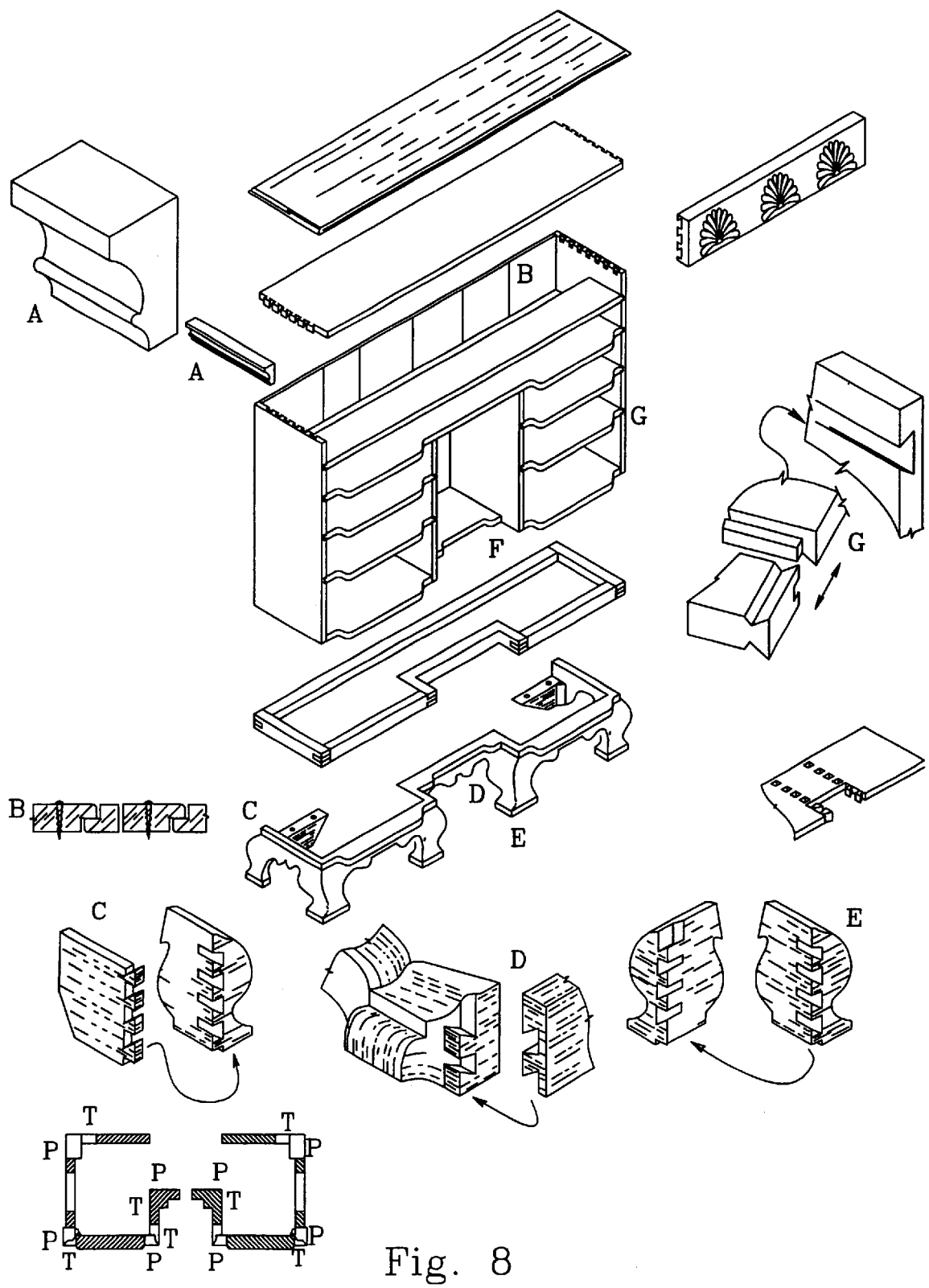
FIG. 8 is an exploded view of the desk of FIG. 7.

FIG. 6 shows a flow chart diagram depicting the logic of the present invention. At the very initial stage, a designer must design and program all the machine instructions, layouts and operator instructions pertaining to a particular production. For example, assuming the product is a desk as shown in FIG. 7. This desk is a composite of numerous parts as shown in an exploded view of the desk in FIG. 8. A designer must identify each part as shown. The designer must then determine the appropriate machining processes to be performed on different wood-stocks as shown by example in FIG. 9 to arrive at the desired parts. The designer then must write a program providing the machining instructions and operator instructions.

Upon a production run, there is a master program allowing selection of a particular production among various available productions as shown in step 200. Upon receiving a selection, the computer retrieves the machine macros related to the selected product, as shown in step 202. The computer then provides instructions regarding worktable layouts and machine setup requirements to the operator via monitor 56 and speaker 64, as shown in step 204. Once the worktable layouts and machine setup requirements are determined to be satisfied in step 206, the manufacturing process is initiated, as shown in step 208. The steps from 208 to 222 are actual subroutines called by the master program. This subroutine actually contains the specific computer instructions and operator instructions. The computer would inform the operator the work zones and their respective instructions through monitor 56 and speaker 64, as shown in step 212.

Since the operator will be moving about the worktable instead of being stationary in front of the monitor, it is preferable for the instructions to be given through speaker 64, so that the operator does not need to read from the monitor for each instruction.

For example, the instruction may be "putting a 2"×4"×24" board on work area 104 aligning the 24" length with the x-axis of the fence." Hearing this instruction, the operator would place wood stock 300 in work area 104 as instructed. The operator can quickly check whether the right wood stock is placed by checking the wood stock dimensions through the rulers on the fences. Once instructions are given for each work area and they are implemented by the operator at step 216, the operator can inform the computer the status through either a start switch, a keyboard, a mouse, a remote control button, etc. The machine would then perform the programmed machining processes in all work zones as shown in step 218. At the end of this process cycle, if there are more instructions, steps 212, 214, 216 and 218 will be repeated for the next set of instructions. During the machining time, the operator is free to assembly the machined parts.

If all instructions are completed, the subroutine will return to the master program. At the master program, another product selection can be made in step 224. If another selection is made, then a new subroutine will be called to repeat steps 208 to 222. If no more selection is made, the master program comes to a complete halt in step 226.

The present invention has been described in terms of one preferred embodiment. Numerous variations and changes will become apparent to those having ordinary skill in the art. It is intended that all such variations and changes being within the scope of the present invention as limited solely by the following claims.

We claim:

1. A method of producing products with the use of a Computer Numerical Controlled (CNC) machine, comprising the steps of:
   a) assigning various work zones having perimeters on a worktable;
   b) positioning a set of pins and a set of fences along at least a portion of the perimeter of each work zone, each of said fences having linear scale markings;
   c) securing each set of fences by fastening means;
   d) providing an audio file of part placement instructions;
   e) retrieving part placement instructions from said audio file of the CNC control;
   f) providing part placement instructions for each work zone by an audio device;
   g) placing various parts in selected work zones in compliance with the audio part placement instructions;
   h) verifying correct part placement of each part by comparing instructed part dimensions with part dimensions indicated by the linear markings;
   i) securing each of said parts by one of clamping and suctioning methods;
   j) indicating completion of all part placements;
   k) selecting a predetermined tool bit for each of said parts before machining that part;
   l) executing programmed machine operations with respect to said parts placed in said work zones;
   m) assembling machined parts while remaining parts are being machined; and
   n) repeating steps f to m until a parts are machined.

2. The method of claim 1, including positioning said set of fences to form an L-shape.

3. The method of claim 2 including providing a gap separating a transverse segment and a horizontal segment of the L-shaped fences thereby allowing removal of particulate materials therebetween.

4. The method of claim 1 wherein the set of fences comprise locating fences.

5. The method of claim 1 including retrieving instructions from a video file of the CNC control and displaying said instructions by a CNC control monitor.

6. The method of claim 1 wherein the part placement instructions further comprise placement orientations.

7. The method of claim 1 including providing a plurality of suctioning zones on the worktable, each zone being independently controlled.

8. The method of claim 1 including providing at least one seal at each work zone of the worktable to enhance the securing effect of suctioning.

9. The method of claim 1 wherein the fastening means include at least one of a group consisting of screwing, suctioning, and clamping.

10. A method of producing products with the use of a Computer Numerical Controlled (CNC) machine, comprising the steps of:

assigning various work zones having perimeters on a worktable;

providing an audio file of part placement instructions;

retrieving part placement instructions from said audio file of the CNC control;

sequentially providing part placement instructions for each work zone by an audio device;

placing various parts in selected work zones in compliance with said audio part placement instructions;

selecting a predetermined tool bit for each part before machining that part;

executing programmed machine operations with respect to said parts placed in said work zones; and assembling machined parts of the product while remaining parts are being machined, until all parts are machined.

11. The method of claim 10 including the step of positioning a set of pins along at least a portion of the perimeter of each work zone of the worktable.

12. The method of claim 10 including the step of placing a set of fences each with linear scale markings along each work zone of the worktable.

13. The method of claim 12 including the step of securing each set of fences to said worktable by fastening means.

14. The method of claim 10 including the step of verifying correct part placement of each part by comparing instructed part dimensions with part dimensions indicated by the linear scale markings.

15. The method of claim 10 including the step of securing each part by a method including at least one of clamping and suctioning.

16. The method of claim 10 including the step of indicating completion of all part placements.

17. The method of claim 10 including generating instructions to the machine for performing dovetailing and edge boring operations on parts secured to a vertical side table of said machine.

18. The method of claim 10 including performing at least one of a group of operations including carving, boring, cutting, grooving, molding, shaping, routing, mortising, edge working, sawing, planing, squaring, sanding and dovetailing.

19. The method of claim 10 including positioning said set of fences to form an L-shape.

20. The method of claim 19 including providing a gap separating a transverse segment and a horizontal segment of the L-shaped fences thereby allowing removal of particulate materials therebetween.

21. The method of claim 10 including retrieving instructions from a video file of the CNC control and displaying said instructions by a CNC control monitor.

22. The method of claim 10 including generating part orientation instructions.

23. A method of producing products with the use of a Computer Numerical Controlled (CNC) machine, using the machine operations of carving, boring, cutting, grooving, molding, shaping, routing, mortising, edge working, sawing, planning, squaring, sanding, drilling and dovetailing to machine various parts of the product, comprising the steps of:

assigning various work zones having perimeters on a worktable;

providing an audio file of part placement instructions;

retrieving part placement instructions from said audio file of the CNC control;

providing part placement instructions for each work zone by an audio device;

placing each part in a corresponding work zone in compliance with the audio part placement instructions;

selecting a predetermined tool bit for each part before machining that part;

executing programmed machine operations with respect to said parts placed in said work zones; and assembling machined parts of the product while remaining parts are being machined, until all parts are machined.

24. A Computer Numerical Controlled (CNC) machine for machining various parts of a product, comprising:

at least one toolhead assembly;

tool change means for changing tool bits;

a worktable comprising a plurality of work zones;

a combination of a set of pins and fences disposed adjacent each work zone to accommodate a particular part;

an-audio file in the CNC control containing part placement instructions for each part in a corresponding work zone;

an audio device reproducing part placement instructions to an operator; and securing means for securing a part in each work zone;

wherein the toolhead assembly is operable to automatically select a predetermined tool bit from the tool change means to machine each part of the product.

25. The CNC machine of claim 24 wherein the tool change means comprises a tool changer comprising of a plurality of tool bits.

26. The CNC machine of claim 25 wherein the toolhead assembly is operable to automatically select a predetermined tool bit from the tool changer.

27. The CNC machine of claim 24 wherein the tool change means comprises a rotary turret system including a plurality of toolhead assemblies.

28. The CNC machine of claim 24 wherein instructions retrieved from a video file of the CNC control also are displayed by a CNC control monitor.

29. The CNC machine of claim 24 wherein the toolhead assembly is operable to perform machine operations including dovetailing, edge working, routing, drilling and boring to parts secured to a vertical side table.

30. The CNC machine of claim 24 wherein the toolhead assembly is operable to perform machine operations including carving, boring, cutting, grooving, molding, shaping, routing, mortising, edge working, sawing, planing, squaring, sanding, drilling and dovetailing on all parts of a product.

31. The CNC machine of claim 24 wherein the set of pins comprise a set of pop-up pins.

32. The CNC machine of claim 24 wherein the fastening means include at least one of a group consisting of screwing, clamping, and suctioning.

33. The CNC machine of claim 24 wherein the securing means is operable to secure a part by a method consisting of one of clamping and suctioning.

34. The CNC machine of claim 24 wherein the set of fences is positioned to form an L-shape.

35. The CNC machine of claim 24 wherein the part placement instructions further comprises placement orientations.

36. A method of machining by integrating machining instructions, operator instructions and sequence of operations into a program stored in a CNC control, comprising the steps of:

retrieving operator instructions from the program;

providing operator instructions for each of various work zones by an audio device;

placing a part in each work zone in compliance with the operator instructions; and machining each part based on the machining instructions.

37. A Computer Numerical Controlled (CNC) machine operable to integrate machining instructions, operator instructions and a sequence of operations into a program stored in the CNC control, comprising:

at least one toolhead assembly;

a worktable provided with various work zones;

an audio device for audibly providing said operator instructions to the operator instructing placement of a particular part in each work zone; and securing means for securing each part to each work zones;

wherein said machining instructions control the operations of the toolhead assembly to machine each part.

* * * * *

UNITED STATES PATENT AND TRADEMARK OFFICE
CERTIFICATE OF CORRECTION

PATENT NO.     : 6,502,002 B2
DATED          : December 31, 2002
INVENTOR(S)    : Kenneth J. Susnjara et al.

It is certified that error appears in the above-identified patent and that said Letters Patent is hereby corrected as shown below:

Column 5,
Line 8, delete "sized" and insert -- sizes -- in lieu thereof.

Column 10,
Line 10, delete "zones" and insert -- zone -- in lieu thereof.
Line 13, please add the following claim:
38. A Computer Numerical Controlled (CNC) machine for machining various parts of a product, including machine operations of carving, boring, cutting, grooving, molding, shaping, routing, mortising, edge working, sawing, planing, squaring, sanding, drilling, and dovetailing, comprising:
  at least one toolhead assembly;
  tool change means for tool changing;
  a worktable comprising a plurality of horizontal work zones;
  at least one vertical side table comprising a plurality of vertical work zones;
  an audio file in the CNC control containing part placement instructions for each part in a corresponding work zone;
  an audio device reproducing part placement instructions to an operator; and
  securing means for securing a part to each work zone;
  wherein each work zone has a plurality of pins and fences to accommodate a particular part in its corresponding work zone.

Signed and Sealed this

Twenty-second Day of July, 2003

JAMES E. ROGAN
*Director of the United States Patent and Trademark Office*